Nov. 10, 1959 A. R. BIEDESS Re. 24,732

BREAKER ROLLER FOR BORING HEADS

Original Filed March 5, 1957 2 Sheets-Sheet 1

INVENTOR.
Anthony R. Biedess
BY
Murray A. Gleeson
ATTORNEY

BREAKER ROLLER FOR BORING HEADS

Original Filed March 5, 1957 2 Sheets-Sheet 2

INVENTOR.
Anthony R. Biedess
BY
Murray A. Gleeson
ATTORNEY

United States Patent Office

Re. 24,732
Reissued Nov. 10, 1959

24,732

BREAKER ROLLER FOR BORING HEADS

Anthony R. Biedess, Chicago, Ill., assignor to Goodman Manufacturing Company, Chicago, Ill., a corporation of Illinois Original No. 2,823,025, dated February 11, 1958, Serial No. 644,105, March 5, 1957. Application for reissue April 29, 1959, Serial No. 809,896

5 Claims. (Cl. 262—33)

Matter enclosed in heavy brackets [ ] appears in the original patent but forms no part of this reissue specification; matter printed in italics indicates the additions made by reissue.

This invention relates to improvements in rolling core breakers adapted for use with mining machines of the rotary boring type, wherein a boring head is provided with a plurality of radially-spaced forwardly projecting cutters adapted to form a series of concentric kerfs in a solid face of mineral, and with a plurality of rolling core breakers also mounted on the boring head in radially spaced positions so as to break away the cores left between the previously formed kerfs.

It has been found in practice that the conventional form of core breaker having a continuous wedge shaped cutting edge about its periphery has a tendency to slip off to one side or the other when working in certain kinds of mineral, as for instance, in salt. Attempts have been made to correct this tendency by making the circular cutting edge more or less discontinuous, but this has usually led to other difficulties, principally because the cutting edge tends to fill up with salt so as to approximate a continuous edge having reduced penetration and wedging action.

The object of the present invention is to provide a special form of discontinuous cutting edge for core breaker rollers which is self-cleaning and produces more efficient penetration than has previously been deemed possible, particularly where working in salt and minerals having similar properties.

The invention may best be understood by reference to the accompanying drawings, in which.

Figure 1:
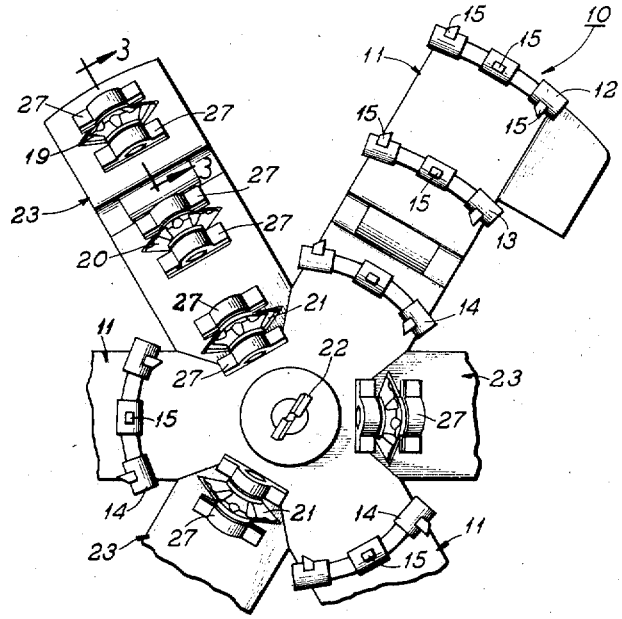
Figure 1 is a fragmentary front view of a cutter head of the type in which the invention is embodied.
Figure 2:
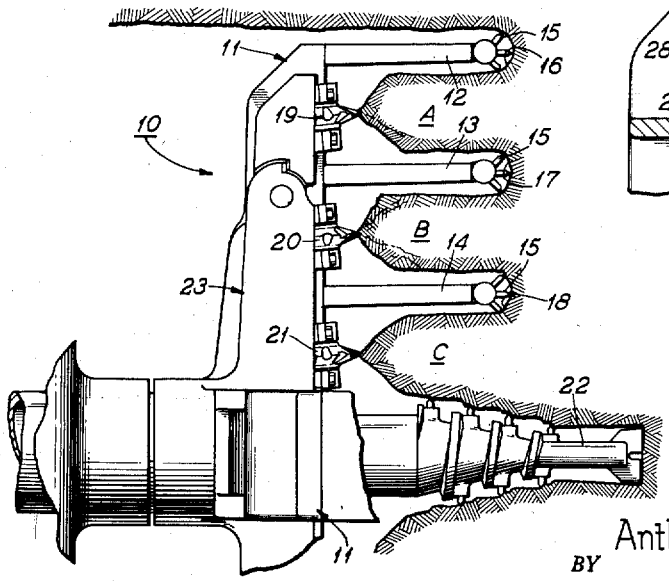
Figure 2 is a side view in partial section taken alternately through the two cutter head arms shown at the top of Figure 1, to illustrate the relative radial positions of the cutters and the roller core breakers mounted on the respective arms.

Referring now to details of the embodiment of the invention illustrated in the drawings, a cutter head indicated generally at 10 in Figures 1 and 2 has a plurality of radially extending arms, in the form shown herein one set of arms 11 being provided with a series of radially spaced, forwardly projecting cutter supports 12, 13 and 14, each having cutter bits 15 along their forward ends for cutting a series of concentric kerfs 16, 17 and 18, respectively, in a mine face. A pilot cutter 22 projects from the center of the boring head as usual.

A series of rolling cam breakers 19, 20 and 21 are mounted on the boring head in trailing relation to the cutter supports 12, 13 and 14 so as to engage and break down, with a wedging action the cores A, B and C left between the kerfs 16, 17 and 18, and the pilot cutter 22, as indicated in Figure 2. In the preferred form shown herein, the core breakers 19, 20 and 21 are rotatably mounted on separate arms 23, circumferentially spaced from the arms 11, but it will be understood that the core breakers can be mounted on the arms 11, in trailing relation to the cutter supports, if desired.

Each of the core breakers consists of a disc mounted for free rotation on a shaft 26 supported at opposite ends in bearings 27, 27 fixed to an arm 23. Each core breaker has a pair of opposed frusto conical side faces 29 forming a generally circular, or wedge shaped periphery defining a leading edge 30.

The leading edge is made discontinuous by forming alternately disposed, radially extending concave flutes 28 in the two conical side faces 29, each intersecting the opposite face 29 so that the leading edge 30 consists of a series of concentric wedge portions 31, 31 interrupted by concavely scalloped cutter wedge portions 32, 32 curved alternately in opposite directions. The scalloped wedge portions 32 form cutting edges as sharp, or sharper than the higher wedge portions 31.

Figure 3:
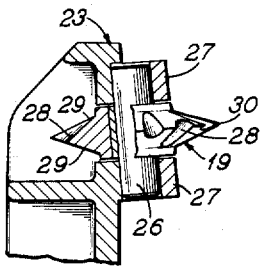
Figure 3 is a detail cross section taken on line 3—3 of Figure 1.
Figure 4:
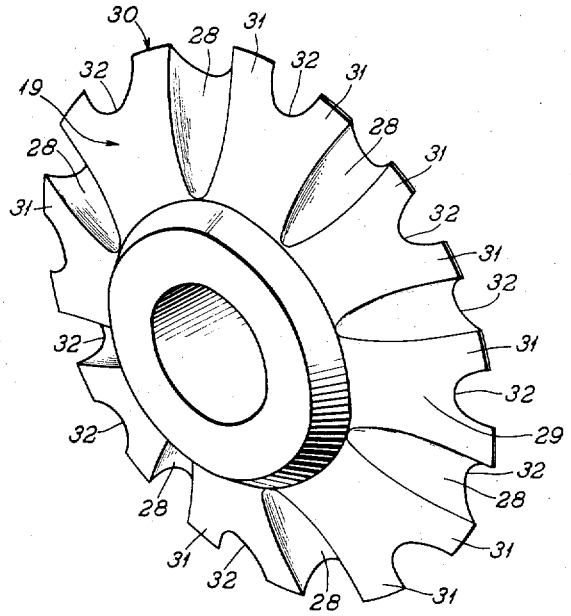
Figure 4 is an enlarged perspective view of one of the core breakers.
Figure 5:
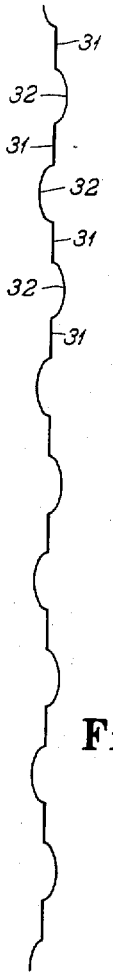
Figure 5 is a diagrammatic view showing the track or pattern of the cutting edge of the core breaker.

The flutes 28 are preferably of increasing depth toward the outer periphery of the disc, as will be seen from Figures 3 and 4.

It will now be understood that, as each roller disc 25 engages a core of material, the scalloped wedge portions 32 cut alternately on one side and then the other of the wedge portions 31 on the central plane of rotation of the disc, so as to tend to stabilize the disc and cause it to run in a straight path. The track or pattern followed by the wedge portions 31 and 32 of the disc or roller is illustrated diagrammatically in Figure 4.

Due to the scalloped shape of the cutting periphery of the disc or roller, the concave flutes 28 tend to spurn the material alternately in opposite directions as it is engaged by the disc, so as to afford a self-cleaning action for the peripheral edge of the roller, and also greatly increasing the penetrating and wedging action for breaking down the solid cores.

Although I have shown and described a certain embodiment of my invention, it will be understood that various changes and modifications may be made without departing from the spirit and scope of the invention as defined by the appended claims.

I claim:

1. A breaker roller for boring heads comprising a disc having opposed outwardly converging side faces defining a generally circular wedging periphery, said side faces having radially extending concave flutes alternately disposed therealong terminating in concavely scalloped cutting wedge portions curved alternately in opposite directions and connected with arcuate centrally disposed wedge portions of the periphery.

2. The structure of claim 1, wherein the concave flutes are of gradually increasing depth near the outer periphery of the disc.

3. The structure of claim 1, wherein both side faces are frusto-conical.

*4. A cutting head for a boring type mining machine comprising rotatable means, at least one pair of outer and inner cutter supports thereon, cutter bits on said supports adapted to cut radially spaced circular recesses upon rotation of said means and leaving a projecting ring of material therebetween, and at least one crusher roller mounted for rotation and in a location in which it contacts said ring of material and rolls thereon at substantial distances from any of said recesses as the machine advances said bits to produce said recess, said roller having a shape forming a margin composed of aligned tooth-forming projections circumferentially spaced along the outer*

*margin of said roller and having non-coplanar cutter portions alternately offset laterally from said tooth-forming projections and having non-linear penetration with the material being crushed.*

*5. A cutting head for a rotary power shaft of a boring type mining machine comprising a rotatable means having radially extending arms, supports for cutter bits near the ends of said arms adapted to produce an outer circular kerf in the material being bored, a central pilot bit support adapted to produce a central pocket in said material, cutter bit supports mounted relatively to the pilot bit support and the outer cutter bit supports to produce an intermediate circular kerf in said material, rollers supported for movements in paths between said outer and intermediate cutter bit supports, additional rollers supported for movements in paths between said intermediate cutter*

*bit supports and said pilot bit support, said rollers having aligned circumferentially spaced marginal cutter portions adapted for rolling contact with said material intermediate said kerfs and said pocket, and having intermediate cutter portions between said marginal cutter portions, said intermediate cutter portions on each roller being alternately offset laterally from said marginal cutter portions on opposite sides thereof to produce non-linear penetration of the material being broken.*

References Cited in the file of this patent or the original patent

UNITED STATES PATENTS

| | | |
|---|---|---|
| 2,668,039 | Cartlidge | Feb. 2, 1954 |
| 2,766,977 | Robbins | Oct. 16, 1956 |